Figure 3:
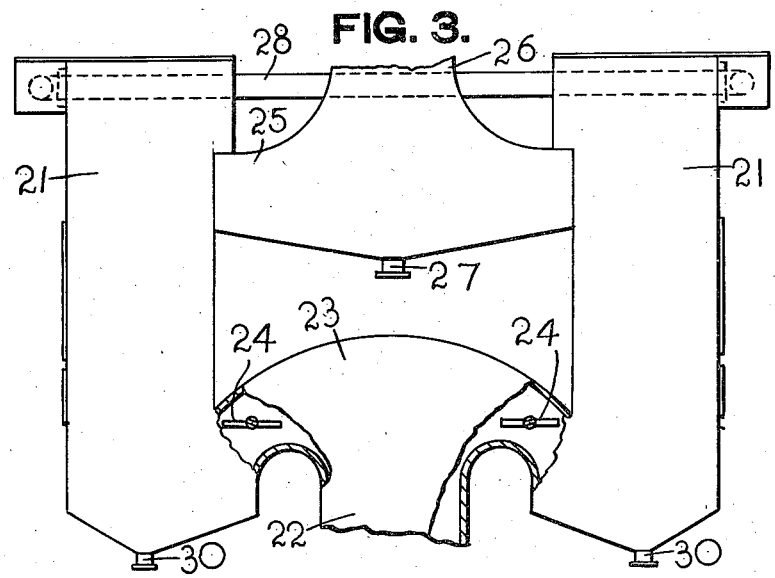

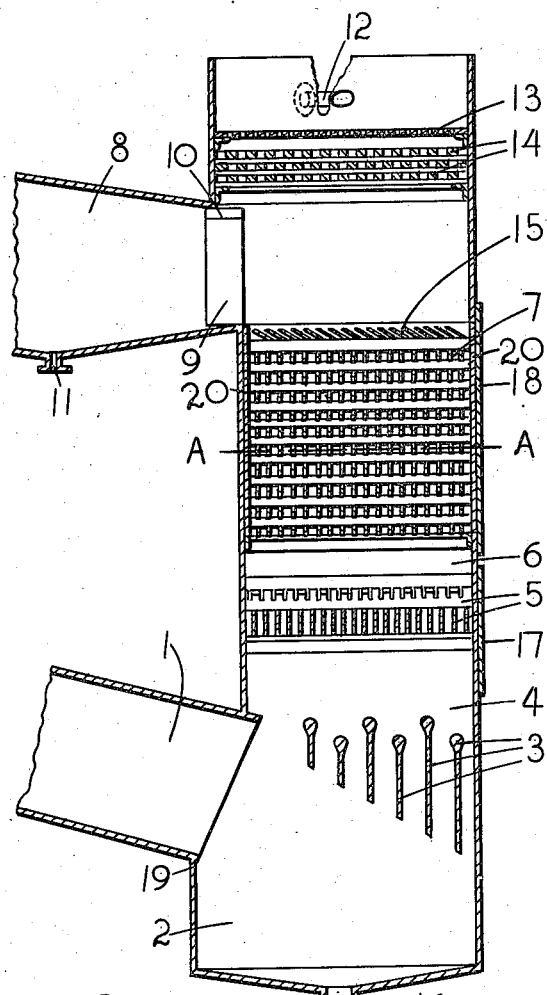
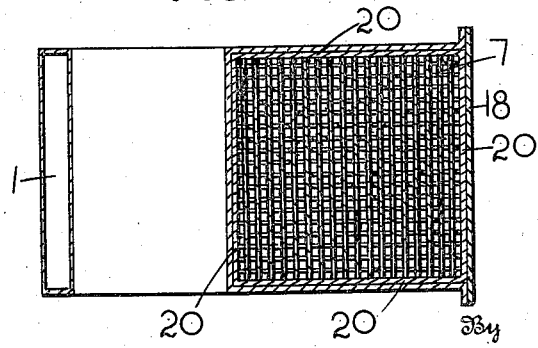

Oct. 6, 1936.  W. LEARMONTH  2,056,429
APPARATUS FOR TREATING GASES WITH LIQUIDS
Filed June 21, 1934  4 Sheets-Sheet 2

Inventor
William Learmonth
By Mayer S. Brown
Attorney

Oct. 6, 1936.  W. LEARMONTH  2,056,429
APPARATUS FOR TREATING GASES WITH LIQUIDS
Filed June 21, 1934  4 Sheets-Sheet 3

Inventor
William Learmonth
By *[signature]*
Attorney

Oct. 6, 1936. W. LEARMONTH 2,056,429
APPARATUS FOR TREATING GASES WITH LIQUIDS
Filed June 21, 1934 4 Sheets-Sheet 4

Patented Oct. 6, 1936

2,056,429

UNITED STATES PATENT OFFICE 2,056,429

APPARATUS FOR TREATING GASES WITH LIQUIDS

William Learmonth, Norton-on-Tees, England, assignor to Imperial Chemical Industries Limited, a corporation of Great Britain Application June 21, 1934, Serial No. 731,732
In Great Britain June 21, 1933

12 Claims. (Cl. 261—112)

This invention relates to apparatus for treating gases with liquids, and is especially applicable to absorption, dedusting, distillation or rectification processes, and to processes for the removal of constituents from solutions such as the deaerating of water. It is also applicable for carrying out chemical reactions between gases and liquids, and for transferring heat between gases and liquids.

The object of the invention is to provide an apparatus for treating gases with liquids which is more efficient than known apparatus and which is simple in construction and reliable in operation. It is also an object of the invention to provide an apparatus or gas scrubber of comparatively small size for a given duty and which is consequently cheap and convenient to install.

I have found that the apparatus according to the present invention gives surprisingly high efficiencies compared with those obtainable with standard scrubbers, the measure of efficiency being the weight of matter absorbed in unit time per unit area of wetted surface, or regarding the scrubber as a whole the percentage absorption obtained with constant gas and liquor rates and the same area of wetted surface. The overall volume of any complete scrubber made in accordance with my invention is very considerably smaller than the overall volume of a scrubber for the same duty made according to previously known designs. At the same time the gas pressure drop across the scrubber is less than that across standard scrubbers using the same gas velocity, measured just prior to entering the packing. This is due to the regular disposition of the packing elements which I employ, resulting in substantially the whole of the liquor flowing in film formation over the surface of the elements.

The high efficiencies referred to are obtained according to our invention by means of an apparatus comprising a tower containing a main body of packing or gridwork consisting of superposed tiers of packing elements in the form of thin strips of suitable hard material arranged in substantially vertical planes (the elements in each tier being substantially parallel to one another and arranged in contact with and transversely to those in the next tiers) and means for delivering liquid in film formation to the top tier of elements. Further features of the invention will be apparent from the following description. The elements and the arrangement should be such that the free space in the packing is not less than 70 per cent of the volume of the space occupied by the gridwork, and also the distance apart of the elements (hereinafter referred to as the pitch) should not exceed 2½ inches and in addition should be not greater than three times the depth of the individual elements. Further, the depth of the individual elements should preferably not exceed three times the maximum pitch stated, i. e. should not be substantially greater than 7½ inches.

Consistently with the limitations imposed by the material of the gridwork the elements should be as thin as possible, so that a very high volume of gas may be put through the scrubber with a low pressure drop and with no entrainment of the liquor from the elements by the gas, and also with no liquor or suspended solids lodging on the elements. As the thin edges prevent lodging of liquor and/or its contents, in practice I have found that the packing can deal with a liquor containing up to 20 per cent by weight of suspended fine solids without settling and choking.

It is important that the elements forming the gridwork should be completely wetted by passing sufficient liquor over the packing. On the other hand liquor in excess of an optimum quantity, which is fixed for each pitch and is greater the smaller the pitch, is not retained by the elements but drops between the elements instead of flowing in film formation upon them, thus exerting little scrubbing action. These minimum and maximum liquor rates may be determined by observation on the particular packing employed according to the invention. In order to comply with these two conditions whilst allowing a certain latitude in the choice of liquor rate I prefer to employ a pitch not greater than 1½ inches. My experiments have shown that the shallower the elements, within the limits given above, the higher is the gas absorption coefficient and dedusting efficiency, but provided the pitch is limited as stated above the depths up to 7½ inches give very good results.

The packing elements consist of thin strips of metal or wood or other suitable hard material such as synthetic resin. The elements are arranged in substantially vertical planes, the edges of the strips touching the transverse edges of the next lower tier of elements. Spacing and strengthening members may be provided for each tier, but these should be as few as possible and of small cross-section. Alternatively the edges of the elements may be notched at intervals corresponding to the desired pitch of the elements, so that the elements in adjoining tiers interpenetrate slightly. Inasmuch, however, as the interpenetration of the elements results in non-uniform irrigation of the surfaces of the elements and corresponding loss of efficiency, it is preferred that the elements touch without interpenetrating.

The uniform initial irrigation and complete wetting of the elements with sufficient liquor is of great importance, and I have found that a suitable arrangement for this purpose consists of a perforated plate for initial distribution, followed by a gridwork consisting of members of substantial thickness, e. g., wooden bars of square section. The resulting uniformly distributed rain of liquor then falls through a free space near the top of the tower and on to a number of thin slats or distributing elements arranged obliquely in such a way that no vertical passage through them is left, the pitch of these elements preferably approximating to the pitch of the elements forming the main volume of packing. These slats or distributing elements serve to collect the rain of liquor from the gridwork and to deliver it in film formation to the top tier of packing elements, the lower edges of said plates being parallel to and arranged directly over a corresponding number of packing elements in the top tier of the main packing. The liquor is thus distributed over the whole surface of the top tier of the main packing. Alternatively, instead of the arrangement just described, the tops of the uppermost tier of packing elements may be turned over to mask the vertical passages through the packing.

Another method of obtaining uniform irrigation is to employ a number of vertical plates arranged side by side, preferably with the same pitch as the packing elements, and directly over the packing elements. A number of rows of jets are provided for feeding the liquor on to these plates and the depth of the plates is such, for example 18 inches, that the films produced on the plates by the respective jets in each row may flow together so that a uniform film falls from the bottom edge of each plate on to the subjacent packing elements.

The gas to be treated is preferably passed upwardly through the packing and preferably a free space is provided at the base of the packing into which the gas is delivered and which facilitates uniform distribution of the gas over the available cross section. Uniform distribution may be aided by a series of vertical baffles of increasing depth in the direction away from the gas inlet. These baffles are provided with pear-section tops to collect liquor and so keep the baffles irrigated, this being important when the apparatus is employed for the removal of dust in addition to other substances.

Where the gas inlet branch is at the bottom, as in the case of counter-current scrubbing, and especially in cases where the scrubbing liquor is likely to form a scale on coming into contact with the gases, it is desirable to allow for the removal of the bottom tiers of packing for cleaning purposes. For this purpose, the lowest tiers are made detachable from the rest of the packing, and can be withdrawn through a door provided in the side of the scrubber. The lowest tiers may constitute a separate unit of packing, which is provided with oblique distributing elements in the same way as the main unit.

Figure 4:
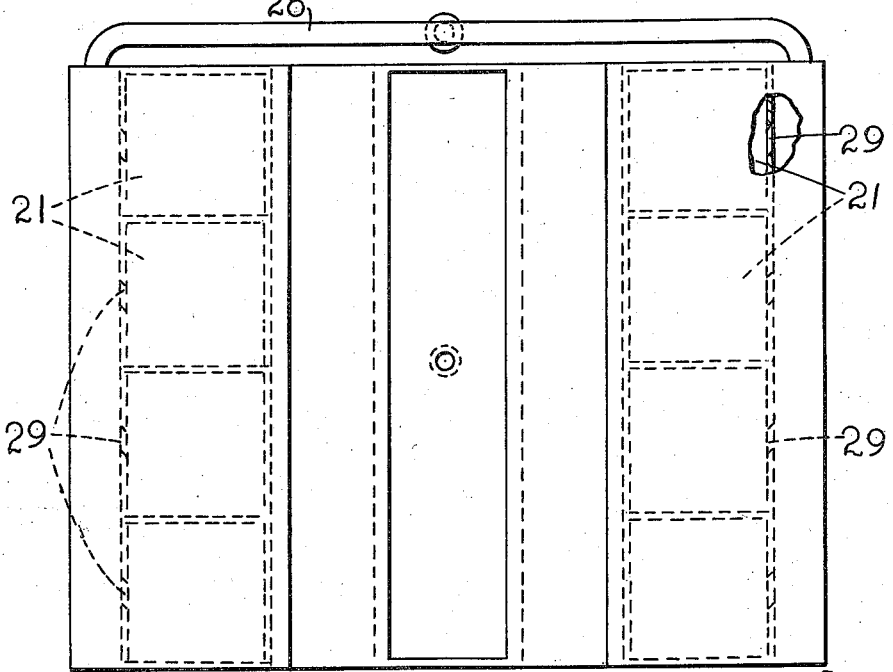
Figure 5:
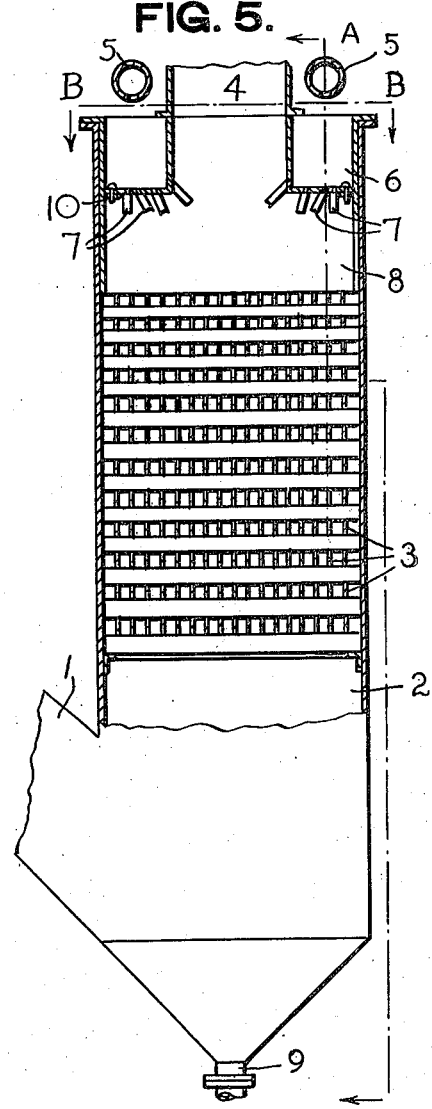
Figure 6:
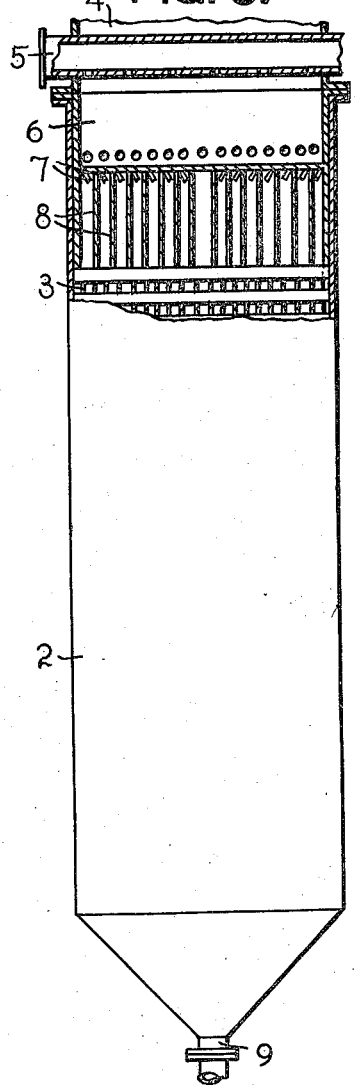
Figure 7:
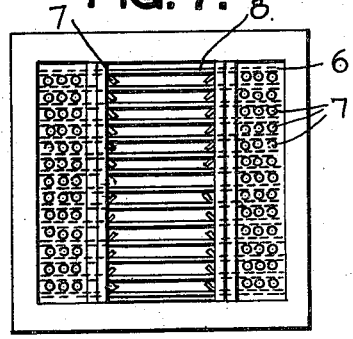
Figure 8:
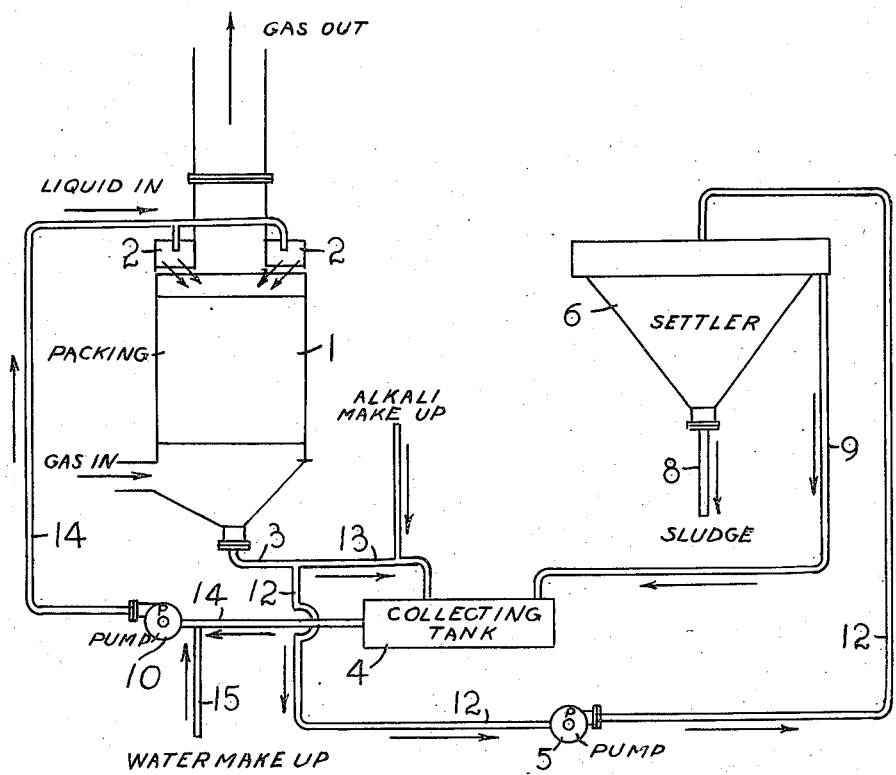

The invention is illustrated in the accompanying drawings, in which Figure 1 is a sectional elevation through the middle of a scrubbing tower and Figure 2 is a sectional plan taken on the line A—A of Figure 1. Figures 3 and 4 are an elevation and plan respectively of a large plant in which a number of towers of the type shown in Figures 1 and 2 are employed in parallel. Figures 5 and 6 are vertical mid-sections of another scrubber, taken at right angles. Figure 7 is a sectional plan on the line B—B of Figure 5, and Figure 8 is a diagrammatic flow sheet of a flue gas washing plant.

Referring to Figures 1 and 2, the gas enters through the duct 1 into the free space 2, where its distribution over the full section of the tower is assisted by means of the baffles 3. These baffles are provided at their upper edges with pear-section members 4 for the collection of the drops of liquor and the distribution of same over the baffles. The gas then passes upwardly through the lower packing 5, which consists of two tiers of thin and relatively deep metal strips, those in the upper tier being notched towards the top, the tongued portions between adjacent pairs of notches being bent in opposite directions. The gas next passes through the free space 6 and through the main body of packing 7. This consists for example of a series of thin parallel metal laths 1 inch deep by $\tfrac{1}{16}$ inch thick with a horizontal pitch of ¾ inch, the overall depth of the packing being 4 feet. The laths are arranged in tiers, successive tiers being at right angles. The space between the packing and the tower walls is stemmed as packed with rope, or suitable soft material, 20, in order to prevent by-passing of the gas and liquor at the walls of the tower. The gas then passes out of the scrubber through the duct 8. Since the gas tends to carry in suspension a certain amount of the rain from the grid 14 when leaving the scrubber, a series of vertical parallel corrugated plates 9 are provided in the gas exit branch, and these have pear-sectioned elements 10 at the top which collect liquor and irrigate the corrugated plates. The liquor flowing from these corrugated elements passes out of the exit duct via the branch 11. The liquor is led tangentially to the scrubber through the pipe 12, where a head of liquor is maintained over the perforated plate 13. The rain of liquor passing through plate 13 falls on to the gridwork 14 consisting of several contacting tiers of square section elements, successive tiers being arranged at right angles. This gridwork serves the purpose of evenly distributing the scrubbing liquor over the whole section of the tower. The rain of liquor next passes through the free space adjacent the gas exit branch, and is collected on the inclined elements 15, which are pitched so that each element feeds uniformly on to the top element of the main grid 7 with which it contacts. The liquor finally leaves the scrubber through the branch 16. In order to provide for the lower portion of the packing 5 or the main body of packing 7 to be withdrawn from the scrubber for cleaning or replacing, doors 17 and 18 respectively are provided.

In the case of gases containing an appreciable amount of dust in suspension, it is desirable to set back the lower edge of the gas duct entering the scrubber from the wall confining the gridwork, as shown at 19, in order to prevent dust adhesion on surfaces which may be only partly wetted.

Referring now to Figures 3 and 4, a number of scrubbing towers 21 are arranged in two batteries and the gas is fed through a duct 22 and branches 23 to the separate towers. A wing valve 24 is provided in the individual gas inlet branches, so that any tower may be isolated.

Similarly, the gas exit branches 25 from the separate scrubbers are collected into a common main 26, from which a single drain 27 for the withdrawal of moisture from the exit ducts is provided. A separate liquor exit branch 30 is, of course, provided in the bottom of each scrubber. The liquor supply to the various scrubbers is conveniently carried out by means of a common main 28 having separate tangential feeds 29 to each scrubber.

Referring to Figures 5, 6, and 7, the gas enters through the duct 1 into the free space 2 and then flows upwardly in a state of turbulence through the packing 3. The packing consists of a series of thin parallel laths 4 ft. x 1 inch x 1/16 inch arranged in tiers, successive tiers being at right angles. The pitch is 3/4 inch. The gas then passes out of the scrubber through the duct 4. Liquor is led to the scrubber through the perforated pipes 5 to symmetrically disposed tanks 6. In and near the base of the tanks 6 are fitted a considerable number of short pipes 7 at suitable inclinations which distribute the liquor substantially uniformly on to the vertical parallel plates 8. These plates are preferably pitched at intervals corresponding to the pitch of the packing elements, and contact directly with them. The plates are made sufficiently deep, for example 18 inches, to ensure that the jets of liquor are joined so as to form a uniform film before flowing on to the packing. The liquor collects under the free space 2 and leaves through the branch 9.

To facilitate erection of the tanks 6 and pipes 7 in relation to the plates 8 and packing 3, locating bolts 10 are provided with allowance for free movement in a vertical direction of the plates 8.

Figure 8 is a diagrammatic illustration of an installation including the scrubber as previously described and designed for the removal of dust and acid constituents from industrial gases such as flue gases. The gas in passing through the scrubber 1 is washed with alkali-treated water entering the scrubber at 2. The liquor leaves the scrubber through the pipe 3 and the greater part is passed to a tank 4 via pipe 13. Part of the liquor, which is relatively dust-laden, is drawn from the pipe 3 through pipe 12 by means of the pump 5 and delivered to a settler 6. Sludge is drawn from the settler 6 through the branch 8 whilst an overflow pipe 9 conducts the clarified liquor to the tank 4. The greater portion of the liquor used in the scrubber is recirculated by means of the pump 10 which draws liquor from the tank 4 by pipe 14. A suitable alkaline liquor, e. g. lime or chalk slurry, is supplied through pipe 11, which joins the pipe 3 at a point subsequent to the branch 12 leading to the pump 5 and settler 6. Make-up water is conveniently added at the suction of the pump 10 through pipe 15.

I claim:—

1. An apparatus for treating gases with liquids comprising a tower having a gas inlet and containing a main body of packing or gridwork consisting of superposed tiers of packing elements in the form of thin strips of suitable hard material arranged in grid formation and in substantially vertical planes, the strips in each tier being substantially parallel to one another and arranged in contact with and transversely to those in the next tiers, means initially distributing liquid uniformly of said tower and means receiving said uniformly distributed liquid and delivering it exclusively in film formation to the top tier of elements, the packing elements and the arrangement being such that the free space in the packing is not less than 70 per cent of the space occupied by the gridwork, and the pitch of the elements does not exceed 2½ inches and in addition is not greater than three times the depth of the individual elements.

2. An apparatus as claimed in claim 1, in which the pitch of the elements does not exceed 1½ inches.

3. An apparatus as claimed in claim 1, in which the contacting edges of the elements are notched so that the elements in adjoining tiers interpenetrate slightly.

4. An apparatus as claimed in claim 1, in which two or more separate gridworks are provided in the tower, each of which has its own liquid delivering means.

5. An apparatus as claimed in claim 1, in which the liquid delivering means comprise a plurality of plates arranged obliquely so that no vertical passage is left between them, the lower edges of said plates being parallel to and arranged directly over a corresponding number of packing elements.

6. An apparatus as claimed in claim 1, in which the liquid distributing means comprise a perforated plate for initial distribution of the liquid, followed by a gridwork consisting of members of substantial thickness and the liquid delivering means comprise a number of thin slats arranged obliquely in such a way that no vertical passage is left through them, said slats serving to collect the rain of liquor from the said gridwork and to deliver it in film formation to the top tier of packing elements, the lower edges of said slats being parallel to and directly over a corresponding number of packing elements.

7. An apparatus as claimed in claim 1, in which the liquid delivering means comprise the turned over edges of the top tier of strips, which are so arranged that no vertical passage is left through the packing.

8. An apparatus as claimed in claim 1, in which the liquid delivering means comprise a plurality of short pipes adapted to distribute liquor substantially uniformly over the surfaces of a plurality of vertical plates pitched at intervals corresponding to the pitch of the packing elements and arranged directly over the same.

9. An apparatus as claimed in claim 1, in which the space between the packing and the tower walls is packed with rope or other suitable soft material in order to prevent by-passing of the gas and liquid at the walls of the tower.

10. An apparatus as claimed in claim 1, in which the gas inlet is at the bottom of the tower and a free space is provided at said bottom, into which the gas is delivered prior to ascending the packing.

11. An apparatus for treating gases with liquids comprising a packing consisting of a number of superposed tiers of packing elements arranged in grid formation, the elements in each tier being arranged transversely to those in the next tiers, the pitch of the elements being such that the liquor flowing down each tier of elements is spread by its surface tension over substantially the whole surface of the next lower tier, without any appreciable quantity falling in the free space, and means for uniformly irrigating and completely wetting the elements with films of liquor, said means consisting of a perforated plate for initial distribution of liquor, followed by a gridwork consisting of members of substantial thickness, and by a number of distributing elements arranged obliquely in such a way that no vertical passage through them is left, said perforated plate, gridwork and distributing elements being located above the packing elements.

12. An apparatus for treating gases with liquids comprising a packing consisting of a number of superposed tiers of packing elements arranged in grid formation, the elements in each tier being arranged transversely to those in the next tiers, the pitch of the elements being such that the liquor flowing down each tier of elements is spread by its surface tension over substantially the whole surface of the next lower tier, without any appreciable quantity falling in the free space, and a plurality of inclined surfaces arranged contiguous the uppermost tier of packing elements to mask the vertical passages through the packing and to act as distributors whereby the liquor may be caused to uniformly irrigate and completely wet the packing.

WILLIAM LEARMONTH.

CERTIFICATE OF CORRECTION.

Patent No. 2,056,429.  October 6, 1936

WILLIAM LEARMONTH.

It is hereby certified that error appears in the printed specification of the above numbered patent requiring correction as follows: Page 2, second column, line 29, for the word "as" read or; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.